W. A. GREAVES.
TAILSTOCK.
APPLICATION FILED MAR. 10, 1919.

1,380,139.

Patented May 31, 1921.

Inventor
William A. Greaves

By Wood & Wood.
Attorneys

UNITED STATES PATENT OFFICE.

WILLIAM A. GREAVES, OF CINCINNATI, OHIO.

TAILSTOCK.

1,380,139. Specification of Letters Patent. Patented May 31, 1921.

Application filed March 10, 1919. Serial No. 281,844.

*To all whom it may concern:*

Be it known that I, WILLIAM A. GREAVES, a citizen of the United States, and residing at Cincinnati, in the county of Hamilton and State of Ohio, have invented a new and useful Improvement in Tailstocks, of which the following specification is a full disclosure.

My invention relates to spindle clamping devices and more specifically to that type usually associated with tail-stock spindles of engine lathes.

The object of the invention is to provide a spindle clamp of the above-mentioned type, which coöperates with the spindle at more than a single point throughout the length of the spindle and which is positive and powerful in its action.

A further object is to provide a spindle clamp of the character specified, having means for adjusting the clamp actuating elements to regulate their action and accommodate for wear of the parts.

The features of the invention will be more fully set forth in the description of the accompanying drawings, forming a part of this specification, in which.

Figure 1:
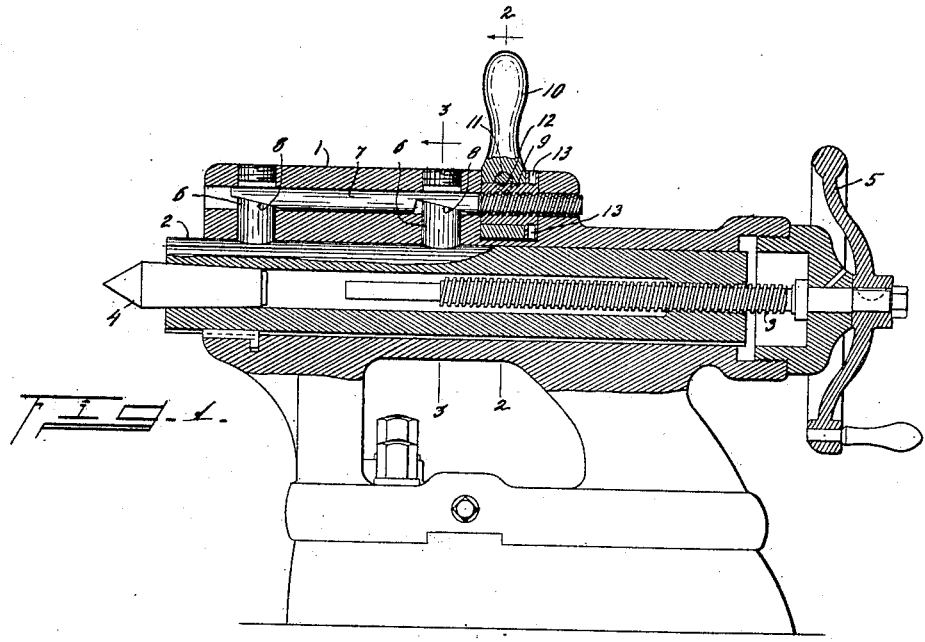
Figure 1 is a central vertical section through the tail-stock and spindle.
Figure 2:
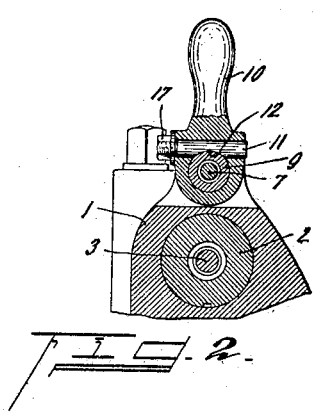
Fig. 2 is a detail transverse section on line 2, 2, Fig. 1.
Figure 3:
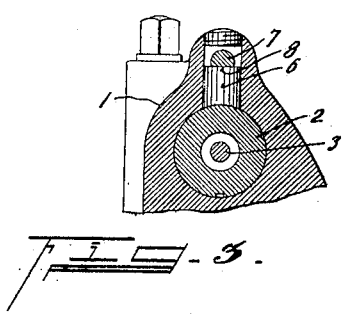
Fig. 3 is a detail transverse section on line 3, 3, Fig. 1.

The tail-stock casting or frame 1 has a longitudinal bore in which is splined the translating spindle 2, the rear portion being bored and threaded to engage the feed screw 3. The feed screw is restrained against longitudinal movement and is rotated by a hand wheel 5 secured to its outer end. The major forward portion of the spindle 2 is counterbored to provide clearance for the feed screw, the extreme forward portion of the counterbore being tapered to provide a rest for the tail-stock center 4.

As thus far described, the mechanism is more or less of a standard construction and requires no further explanation of its operations and purposes.

The means for clamping the spindle 3 against longitudinal movement comprises a pair of clamping studs 6, 6, freely slidable within suitable apertures in the frame 1 adjacent the upper surface of the spindle and engaging therewith, the lower surfaces of the studs being contoured to closely fit the spindle surface. The upper ends of the studs 6, 6, have beveled or angled faces and slidably mounted in a longitudinal bore in the tail-stock frame I provide a translatory wedge rod or clamp actuator 7, having wedge surfaces 8, 8, adapted during a forward translation of the rod to engage with the angled faces of the clamp studs 6, 6, with a cam action to positively force said studs downwardly to rigidly clamp the spindle in set position. The clamp studs 6, 6, move in a radial plane relative to the axis of the spindle, the term "radial clamp elements" broadly defining their position and operation.

The rear portion of the wedge rod 7 is screw threaded and is engaged and translated by an internally screw threaded nut or collar 9, which is retained against longitudinal displacement within a recess in the frame 1 and is rotated by a clamp handle 10. The handle 10 is journaled upon the nut 9 and is normally clamped thereto by a clamp bolt 11, having a flat circular surface 12 engaging against the periphery of the nut, with a clamping action, when said bolt is translated by the action of a nut 17 having a screw threaded engagement with the outer end of the bolt. This adjustable connection is to allow an adjusting rotation of the nut 9 independent of the handle 10 for the purpose of regulating or varying the zones of movement of the wedge surfaces 8, 8, of the wedge rod 7, relative to the angled faces of the clamp studs 6, 6, and for taking up wear.

To facilitate the independent rotation of the nut 9 it is provided with recesses 13 to accommodate a wrench or other manipulative agent.

It will be observed that a rotation of the nut 9 by the handle 10 will translate the wedge rod 7, which, when moved forwardly, will cause its wedge surfaces 8, 8, to engage and force the studs 6, 6, downwardly to exert a clamping pressure upon the periphery of the tail-stock spindle 3.

Figure 4:
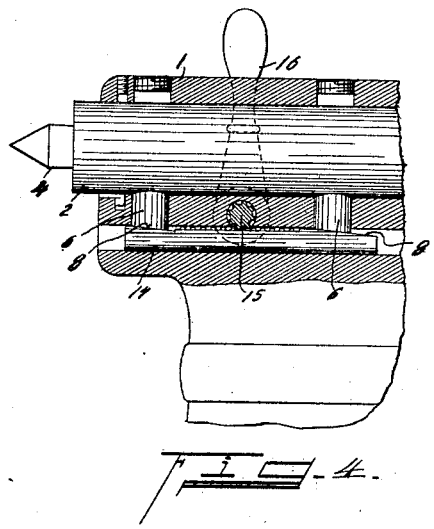
Fig. 4 is a partial vertical section, similar to Fig. 1, showing a modified form of clamp actuating means.

In Fig. 4 there is shown a modified form of wedge rod and means for accomplishing its translation, in which the wedge rod is slidable within a bore in the casting beneath the spindle and in which the clamp studs are forced upwardly to engage the under peripheral surface of the spindle.

In this form of construction the wedge rod 14 is provided with rack teeth engaged by pinion teeth cut in a transverse actuator shaft 15, said shaft extending to the exterior of the frame 1 and provided with a clamp handle 16.

This form of spindle clamp, engaging the spindle at more than one end and at widely separated points along its length, assures a perfectly rigid spindle and obviates the possibility of chatter.

Having described my invention, I claim:

1. A device of the class described, comprising a frame, a spindle, a pair of radial clamps spaced longitudinally of and engaging the spindle, a translatory actuator having wedge engagements with the clamp elements, means for translating the actuator, and means for varying the zone of actuator translation.

2. A device of the class described, comprising a frame, a spindle, a clamp element adapted to engage the spindle, a translatory clamp actuator having a feed screw, a screw threaded nut coöperating with the feed screw to translate the clamp actuator, and a handle for rotating the nut.

3. A device of the class described, comprising a frame, a spindle, a clamp element adapted to engage the spindle, a translatory clamp actuator having a feed screw, a screw threaded nut coöperating with the feed screw to translate the clamp actuator, a handle for rotating the nut, and means permitting an independent adjustment of the nut to vary the zone of actuator translation.

4. A device of the class described, comprising a frame, a spindle, clamp elements movable transversely to and engaging the spindle at relatively widely separated points, a translatory clamp actuator parallel with the spindle coöperating with the clamp elements in a clamping operation, and means for translating the actuator.

5. A device of the class described, comprising a frame, a spindle, a transverse radial clamp stud movable transversely of the spindle having an angled outer end and a concave spindle engaging surface, a translatory actuator movable transversely of the clamp stud having a wedge surface adapted to coöperate with the angled stud end to function the stud in a spindle clamping operation, and means for translating the actuator.

In witness whereof I hereunto subscribe my name, as attested by the two subscribing witnesses.

WILLIAM A. GREAVES.

Witnesses:
CLARENCE B. FOSTER,
LOUISA A. BECK.